(12) United States Patent
Saito et al.

(10) Patent No.: US 11,751,214 B2
(45) Date of Patent: Sep. 5, 2023

(54) APPARATUS AND SYSTEM TO CREATE A TRANSPORT BLOCK UTILIZING AN INPUT APPARATUS

(71) Applicant: NTT DOCOMO, INC., Tokyo (JP)

(72) Inventors: Keisuke Saito, Tokyo (JP); Kazuaki Takeda, Tokyo (JP); Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 145 days.

(21) Appl. No.: 17/478,467

(22) Filed: Sep. 17, 2021

(65) Prior Publication Data
US 2022/0007409 A1    Jan. 6, 2022

Related U.S. Application Data

(63) Continuation of application No. 16/634,354, filed as application No. PCT/JP2017/027520 on Jul. 28, 2017, now Pat. No. 11,153,902.

(51) Int. Cl.
*H04W 72/23* (2023.01)
*H04L 5/00* (2006.01)
*H04W 72/0446* (2023.01)

(52) U.S. Cl.
CPC .......... *H04W 72/23* (2023.01); *H04L 5/0048* (2013.01); *H04W 72/0446* (2013.01)

(58) Field of Classification Search
CPC .. H04W 72/0446; H04W 72/23; H04L 5/0048
(Continued)

(56) References Cited

U.S. PATENT DOCUMENTS 11,153,902 B2 * 10/2021 Saito ................... H04W 72/23
2015/0078281 A1   3/2015 Kishiyama et al.
(Continued)

FOREIGN PATENT DOCUMENTS

EP        3177096 A1      6/2017
JP      2013219501       10/2013
(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Peter G Solinsky
(74) *Attorney, Agent, or Firm* — Osha Bergman Watanabe & Burton LLP

(57) ABSTRACT

According to one aspect of the present invention, an apparatus is disclosed including a transmitter that transmits a transport block (TB) using a physical uplink shared channel based on a downlink control information, a processor that applies a same symbol allocation across a plurality of slots when transmission of the TB is carried out over the plurality of slots, and an input apparatus that accepts an input, wherein the TB contains information based on the input. In other aspects, a system including an apparatus and a base station is also disclosed.

3 Claims, 12 Drawing Sheets

(58) Field of Classification Search
USPC .......................................................... 370/329
See application file for complete search history.

(56) References Cited

U.S. PATENT DOCUMENTS

| | | |
|---|---|---|
| 2015/0271006 A1 | 9/2015 | Han et al. |
| 2016/0205677 A1 | 7/2016 | Kim et al. |
| 2017/0230970 A1 | 8/2017 | Kim et al. |
| 2020/0045722 A1 | 2/2020 | Bae et al. |
| 2020/0067676 A1 | 2/2020 | Yi |
| 2020/0170076 A1 | 5/2020 | Saito et al. |

FOREIGN PATENT DOCUMENTS

| | | |
|---|---|---|
| JP | 2016-501489 | 1/2016 |
| JP | 2017514325 A | 6/2017 |

OTHER PUBLICATIONS

3GPP TSG RAN WG1 Meeting #89; R1-1706901; "TB mapping for slot aggregation" Huawei, HiSilicon; Hangzhou, China; May 15-19, 2017 (7 pages).
International Search Report issued in International Application No. PCT/JP2017/027520, dated Oct. 17, 2017 (5 pages).
Written Opinion issued in International Application No. PCT/JP2017/027520; dated Oct. 17, 2017 (3 pages).
Extended European Search Report issued in counterpart European Patent Application No. 17918833.9, dated Feb. 15, 2021 (9 pages).
ZTE; "Mac Modeling of PDCCH monitoring/TTI length"; 3GPP TSG-RAN WG2 Meeting# NR_AdHoc#2, R2-1706648; Qingdao, China; Jun. 27-29, 2017 (6 pages).
Samsung; "Slot Aggregation"; 3GPP TSG RAN WG1 NR AH, R1-1702992; Spokane, USA, Jan. 16-20, 2017 (3 pages).
CATT; "PRB bundling for DL transmission"; 3GPP TSG RAN WG1 Meeting #89, R1-1710054; Hangzhou, China; May 15-19, 2017 (3 pages).
Samsung; "Continuous precoding of NR DMRS in time domain"; 3GPP TSG RAN WG1 Meeting #88, R1-1702913; Athens, Greece; Feb. 13-17, 2017 (3 pages).
Office Action issued in counterpart Chinese Application No. 201780093590.9 dated Aug. 17, 2021 (13 pages).
Office Action issued in Australian Patent Application No. 2017424879 dated Jun. 21, 2022 (4 pages).
Office Action issued in Indian Application No. 202037003797 dated Mar. 8, 2022 (7 pages).
Office Action issued in counterpart Japanese Application No. 2019-532335 dated Sep. 28, 2021 (8 pages).
Office Action issued in the counterpart European Patent Application No. 17918833.9, dated Feb. 2, 2023 (6 pages).
Qualcomm Incorporated; "Discussion on DL DMRS design"; 3GPP TSG RAN WG1 NR Ad-Hoc#2, R1-1711170; Qingdao, P.R. China; Jun. 27-30, 2017 (12 pages).
Huawei, HiSilicon; "Design of DL DMRS for data transmission"; 3GPP TSG RAN WG1 NR Ad Hoc Meeting, R1-1709941; Qingdao, China; Jun. 27-30, 2017 (5 pages).

* cited by examiner

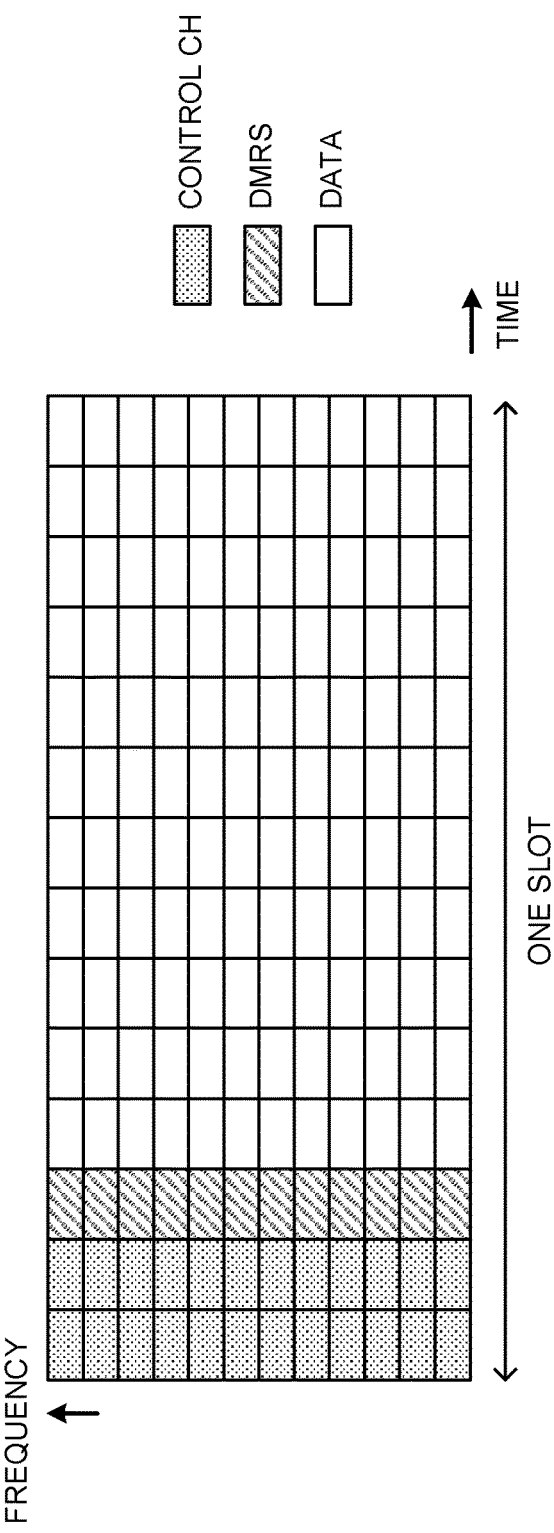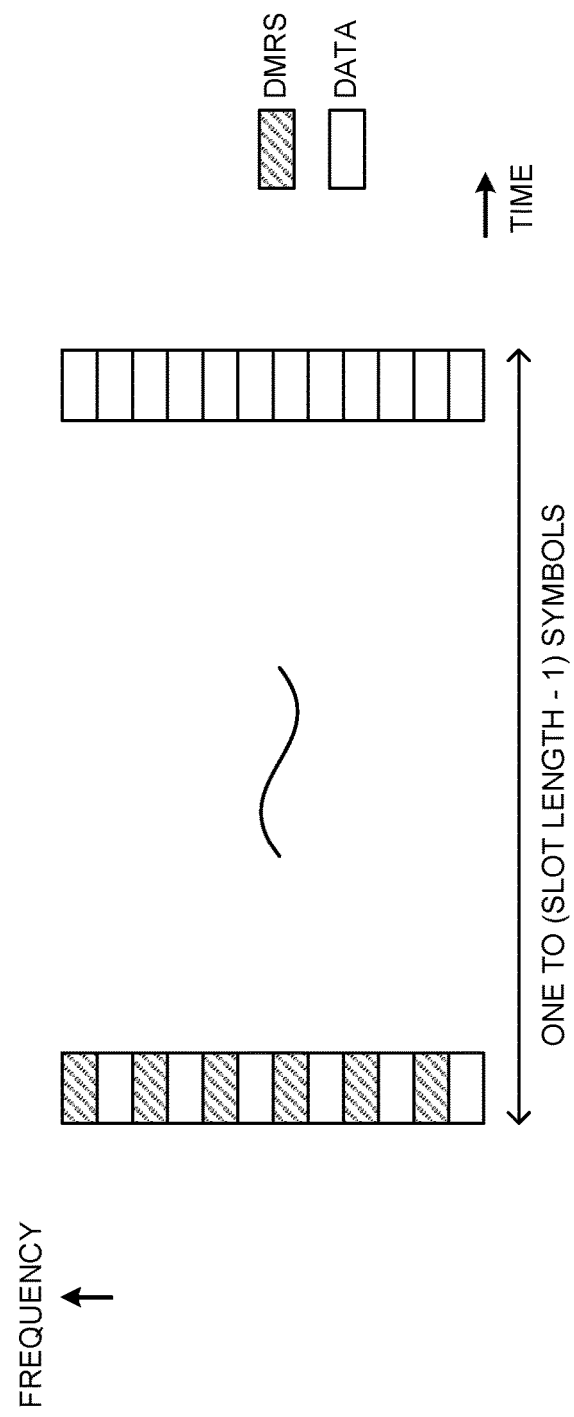
FIG. 1A
FIG. 1B

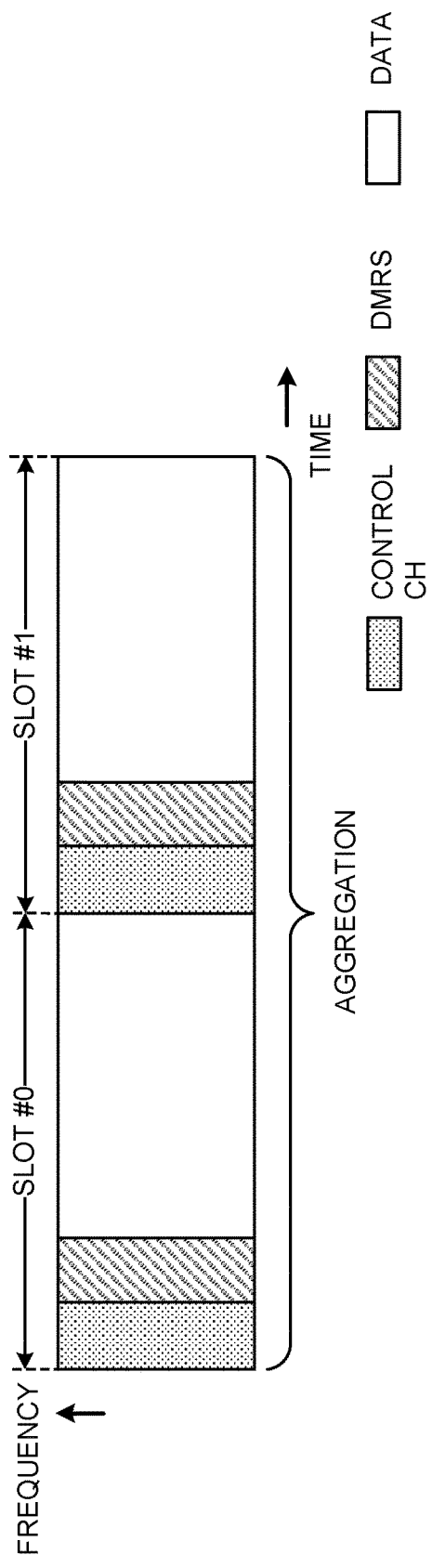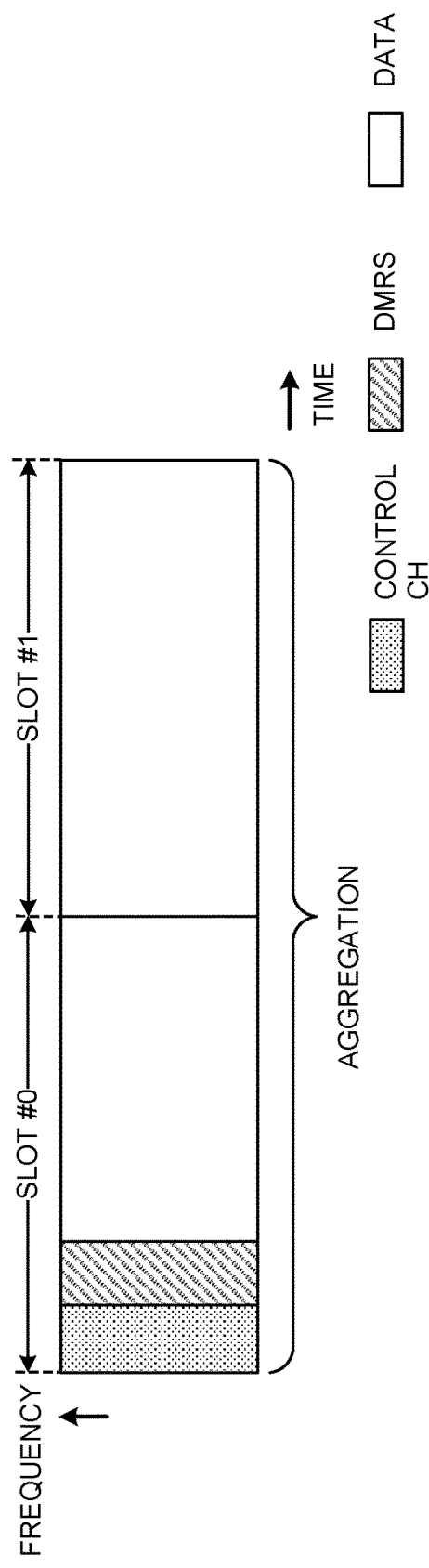

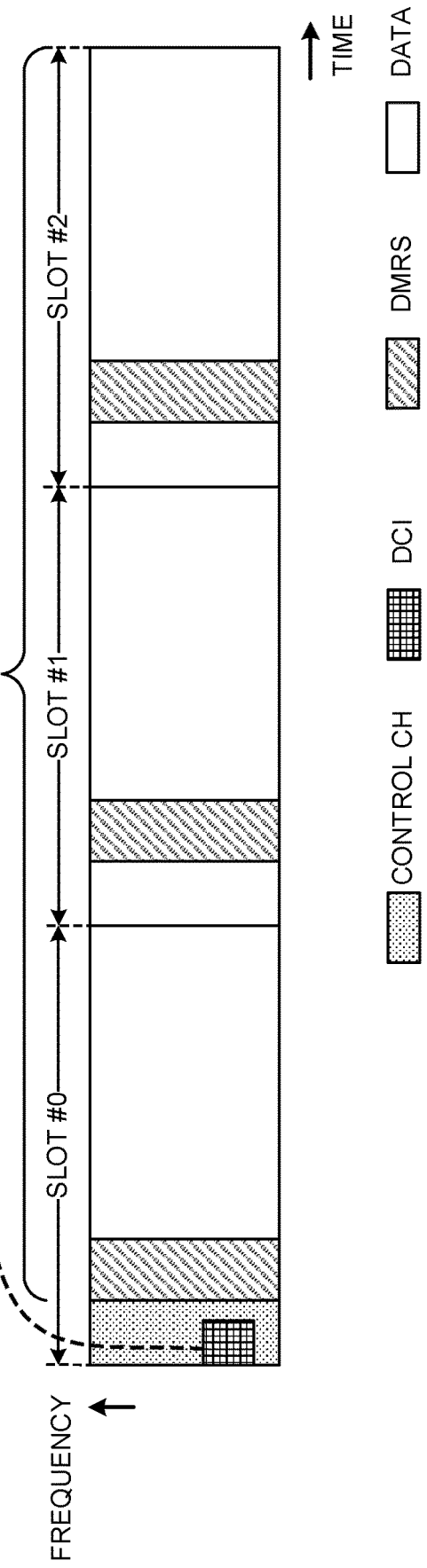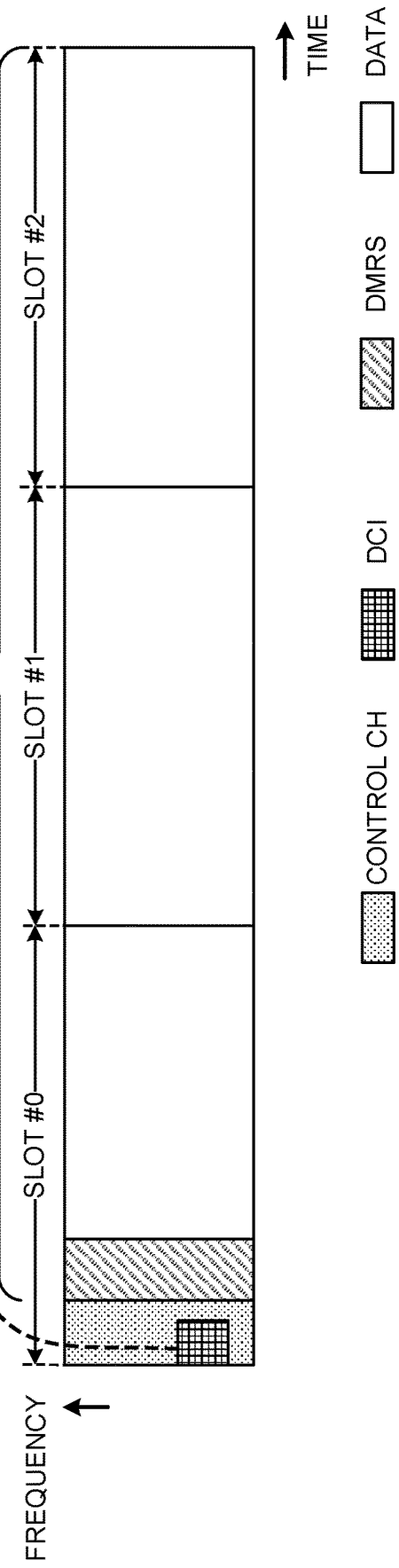

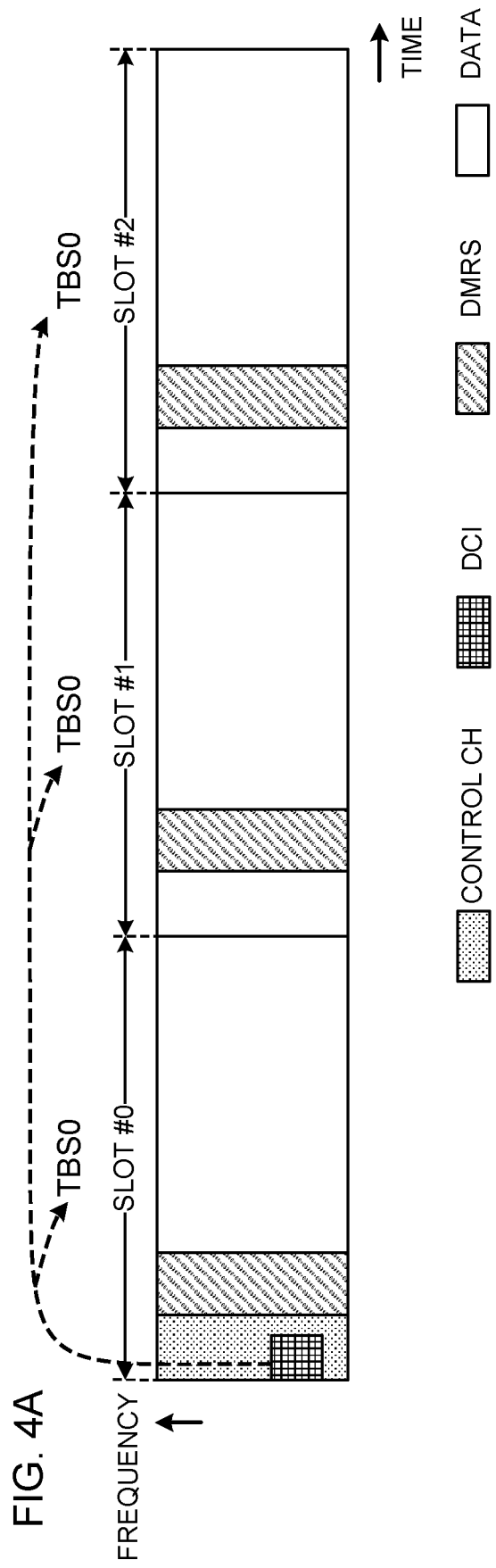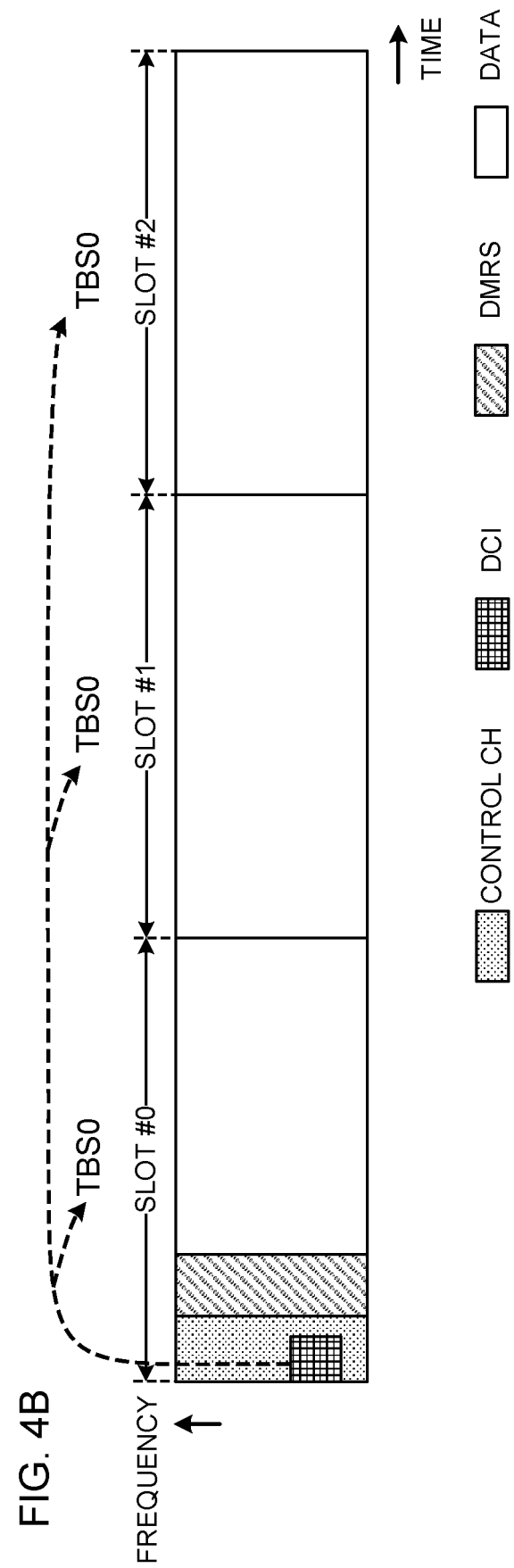

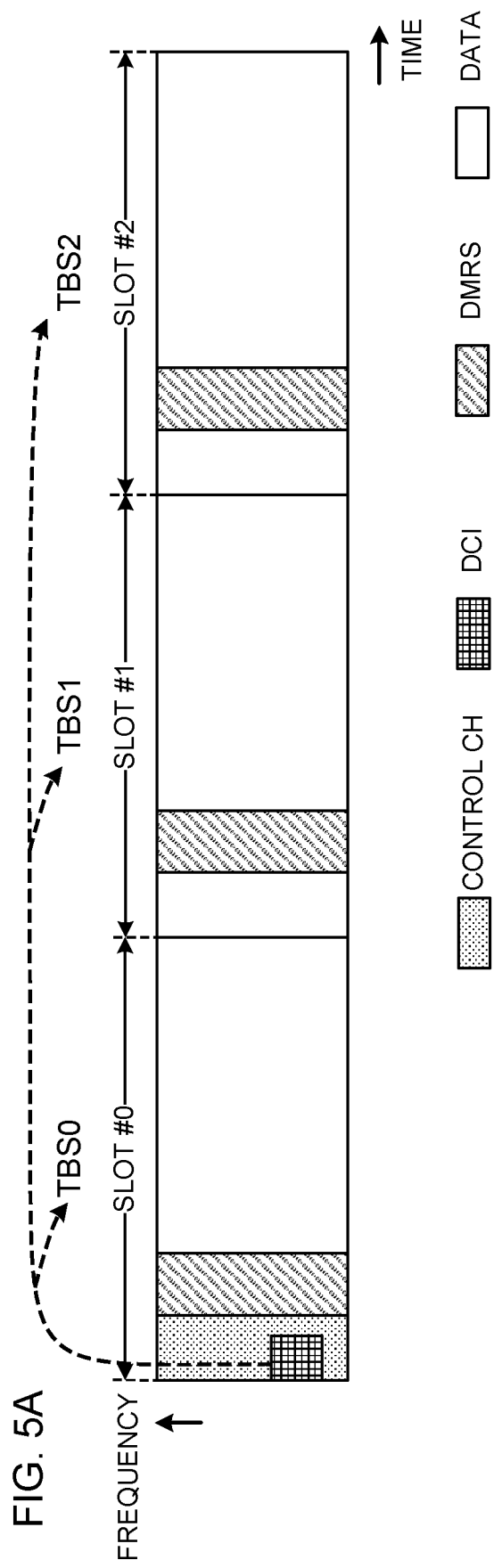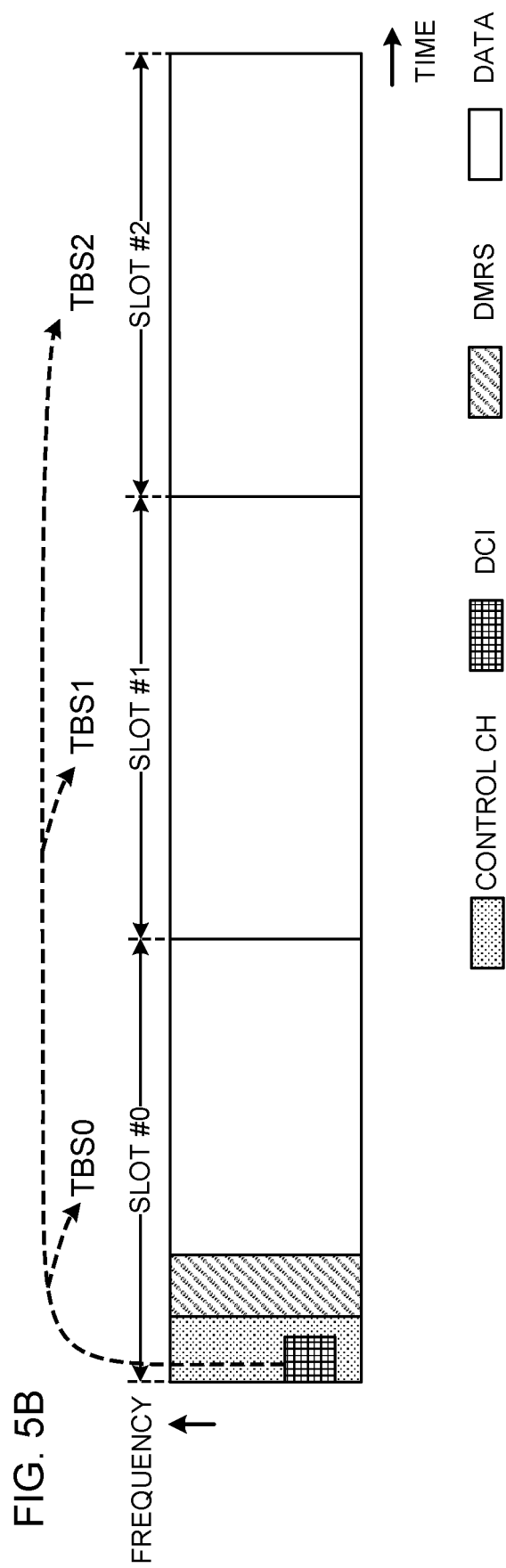

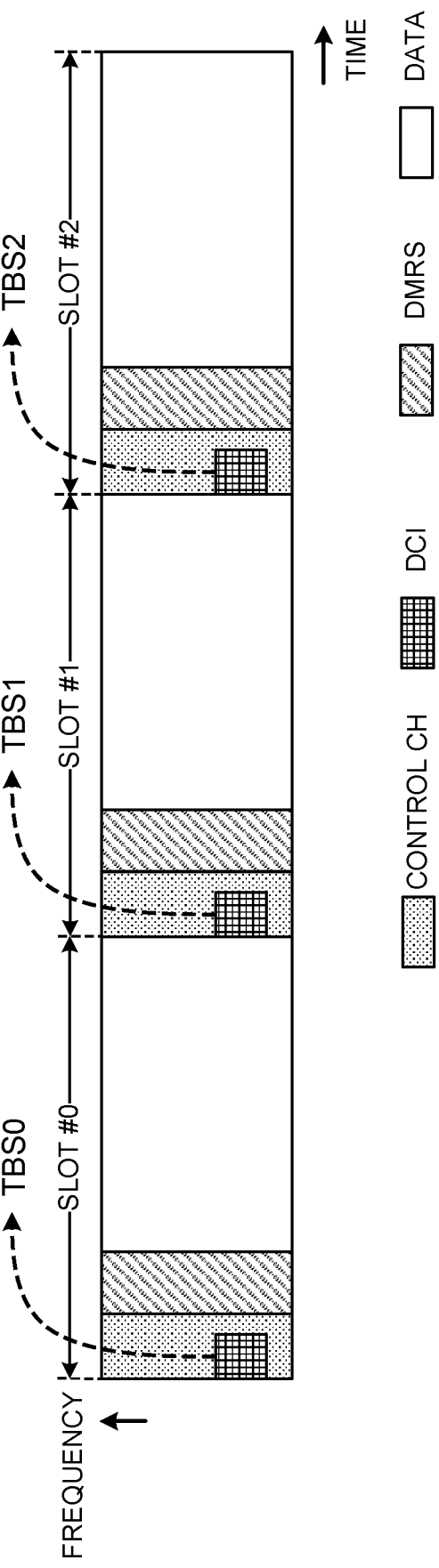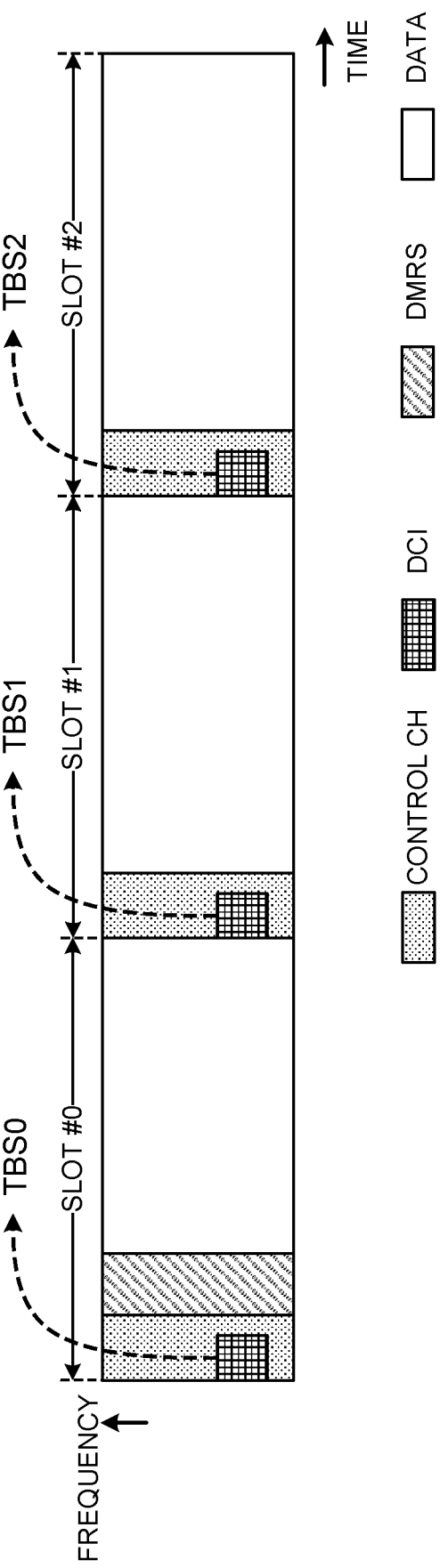

APPARATUS AND SYSTEM TO CREATE A TRANSPORT BLOCK UTILIZING AN INPUT APPARATUS

CROSS-REFERENCE TO RELATED APPLICATIONS

This application is a continuation application and, thereby, claims benefit under 35 U.S.C. § 120 to U.S. patent application Ser. No. 16/634,354 filed on Jan. 27, 2020, titled, "TRANSMITTING APPARATUS, RECEIVING APPARATUS AND RADIO COMMUNICATION METHOD," which is a national stage application of PCT Application No. PCT/JP2017/027520, filed on Jul. 28, 2017. The contents of these applications are incorporated by reference in their entirety.

TECHNICAL FIELD

The present invention relates to an apparatus and a system in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, LTE-A (LTE advanced and LTE Rels. 10, 11, 12 and 13) has been standardized for the purpose of achieving increased capacity and enhancement beyond LTE (LTE Rels. 8 and 9).

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 8 to 13), downlink (DL) and/or uplink (UL) communication are carried out by using 1-ms subframes (also referred to as "transmission time intervals (TTIs)" and so on). This subframe is the unit of time it takes to transmit one channel-encoded data packet, and is the processing unit in, for example, scheduling, link adaptation, retransmission control (HARQ (Hybrid Automatic Repeat reQuest)) and so on.

In addition, a radio base station (for example, an eNB (eNodeB)) controls the allocation (scheduling) of data to user terminals (UEs), and sends data scheduling commands (receiving commands or transmission commands) to the UEs by using downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Envisaging future radio communication systems (for example, NR), research is underway on scheduling that is free of subframes. For example, slot-based scheduling, in which data is scheduled in slot units, and non-slot-based scheduling, in which data is not scheduled in slot units, are study.

In addition, research is in progress on slot (mini-slot) aggregation (also referred to as "slot (mini-slot) bundling," and so on), whereby multiple slots or mini-slots are aggregated (or bundled). Note that aggregation based on non-slot-based scheduling may be referred to as "non-slot aggregation" or "non-slot bundling."

However, what scheduling policies might work best for each of slot aggregation and non-slot aggregation has not been studied yet. Unless these are determined properly, flexible control will not be possible, and the throughput of communication, the spectral efficiency and so on might deteriorate.

It is therefore an object of the present invention to provide transmitting apparatus, receiving apparatus and a radio communication method that reduce the decrease of communication throughput and so on even when slot/non-slot aggregation are used.

Solution to Problem

Transmitting apparatus according to one aspect of the present invention has a transmission section that transmits a plurality of signals that are scheduled in a plurality of time units, respectively, based on downlink control information, and a control section that determines a transport block size (TBS) to apply to the plurality of signals.

Advantageous Effects of Invention

According to the present invention, even when slot/non-slot aggregation are used, the decrease in communication throughput and so on can be reduced.

BRIEF DESCRIPTION OF DRAWINGS

FIGS. 1A and 1B are diagrams to show examples of slot-based scheduling and non-slot-based scheduling;

FIGS. 2A and 2B are diagrams to show examples of slot aggregation;

FIGS. 3A and 3B are diagrams to show examples of allocating and reporting a TBS, according to embodiment 1.1 of the present invention;

FIGS. 4A and 4B are diagrams to show examples of allocating and reporting a TBS, according to embodiment 1.2 of the present invention;

FIGS. 5A and 5B are diagrams to show examples of allocating and reporting TBSs, according to embodiment 1.3 of the present invention;

FIGS. 6A and 6B are diagrams to show examples of allocating and reporting TBSs, according to embodiment 1.4 of the present invention;

DESCRIPTION OF EMBODIMENTS

Figure 7:
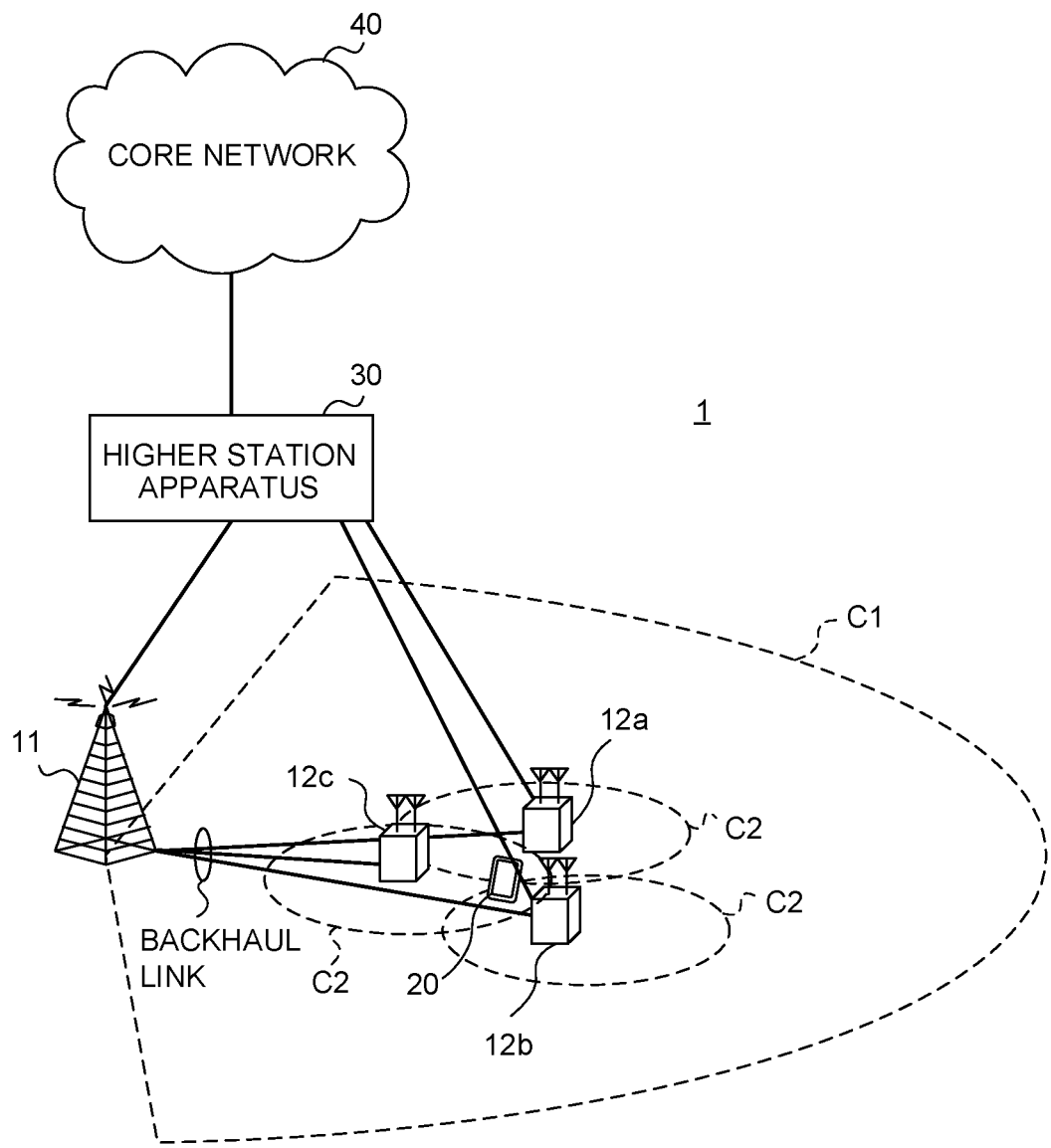
FIG. 7 is a diagram to show an exemplary schematic structure of a radio communication system according to one embodiment of the present invention.

For future radio communication systems (including, for example, LTE Rel. 14, 15 or later versions, 5G, NR and/or others, and hereinafter also referred to as "NR"), studies are underway to introduce time units (referred to as "subframes," "slots," "mini-slots," "sub-slots," "TTIs (Transmission Time Intervals)," "short TTIs," "radio frames" and so on) that are the same as or different from those of existing LTE systems (for example, LTE Rel. 8 to 13).

For example, slot-based scheduling, in which data is scheduled on a per slot basis, and non-slot-based scheduling, in which data is not scheduled on a per slot basis (and scheduled, for example, in smaller time units than slots) are under study.

FIGS. 1A and 1B are diagrams to show examples of slot-based scheduling and non-slot-based scheduling. FIG. 1A shows an example where the length of a slot is fourteen symbols, but the number of symbols may change, and can be, for example, seven. Note that the structures of FIGS. 1A and 1B may be applied to either or both DL data transmission and UL data transmission.

For slot-based scheduling, as shown in FIG. 1A, a study is underway to use a certain symbol in a slot (for example, the third or the fourth symbol from the beginning) at least as a demodulation reference signal (DMRS) for data, on a fixed basis.

Symbols that lie between the beginning of the slot and the DMRS (for example, the first and second symbols) may be used as a control channel (for example, PDCCH (Physical Downlink Control CHannel)), or may be used to transmit data and/or other reference signals if the control channel is small-sized or not inserted. Note that the number of symbols to constitute the control channel is not limited to one or two, and, furthermore, the control channel may be used only for part of the resources in the symbols.

In addition, symbols after the DMRS may be used to transmit scheduled data. By using a structure like this where the DMRS is located before data (front-loaded location), the processing time for channel estimation can be reduced on the receiving end, and data can be decoded at a higher speed. Data and the DMRS may be transmitted by using a shared channel (PDSCH (Physical Downlink Shared Channel), PUSCH (Physical Uplink Shared CHannel) and/or others).

The control channel is used to transmit physical layer control signals (for example, downlink control information (DCI)) from a base station (also referred to as, for example, a "BS (Base Station)," "transmission/reception point (TRP)," "eNB (eNode B)," "gNB," and so on) to a user terminal (UE).

The DCI may serve as scheduling information that provides information related to, for example, at least one of the resource of the scheduled data (time and/or frequency resource), the transport block, the modulation and/or coding scheme, delivery acknowledgment information (also referred to as, for example, "retransmission control information," "HARQ-ACK," "ACK/NACK" and so on), the DMRS configuration, and so forth (and can be, for example, information about the transport block size (TBS)).

DCI that schedules receipt of DL data and/or measurement of DL reference signals may be referred to as a "DL assignment (or a DL grant)." DCI that schedules transmission of UL data and/or transmission of UL sounding (measurement) signals may be referred to as a "UL grant."

By contrast with this, as shown in FIG. 1B, regarding non-slot-based scheduling, a study is in progress to use a certain symbol in scheduled data (for example, the first symbol of scheduled data) at least as a DMRS for data, on a fixed basis.

Non-slot-based scheduling may be controlled in mini-slot units (mini-slot scheduling), or may be controlled in one-symbol or multiple-symbol units. For example, the transmission duration in non-slot-based scheduling may be a variable number of symbols, greater than or equal to one and less than the length of a slot.

Note that DMRSs can be transmitted using multiple symbols in both slot-based scheduling and non-slot-based scheduling. For example, DMRSs may be inserted in multiple symbols in a row in order to support multi-layer transmission, or a DMRS may be inserted behind the DMRS that is located before the data resource, in order to correct Doppler variations during high-speed movements. Also, the resources used for DMRS transmission need not be the same as the data transmission bandwidth. Furthermore, the locations of the control channel and/or the DMRS are not limited to those shown in FIGS. 1A, 1B and so forth.

Now, in NR, research is in progress on slot (mini-slot) aggregation (also referred to as "slot (mini-slot) bundling," and so on), whereby multiple slots or mini-slots are aggregated (or bundled). Note that aggregation based on non-slot-based scheduling may be referred to as "non-slot aggregation" or "non-slot bundling."

FIGS. 2A and 2B are diagrams to show examples of slot aggregation.

Although these are examples of aggregating two slots (slot #0 and #1), mini-slot aggregation, slot-mini-slot aggregation and/or other non-slot aggregations are likewise applicable.

In FIG. 2A, a control channel, a DMRS and data are transmitted in each slot. In this case, the same precoder may be applied to the DMRSs and data of these slots. Also, channel estimation may be executed by using a plurality of DMRSs together.

FIG. 2B is different from FIG. 2A in that no control channel or DMRS is transmitted in slot #1. In this case, the same precoder may be applied to the DMRSs and data of these slots. By using this structure, the data of slot #1 can be decoded based on the DMRS of slot #0, and, in slot #1, data is transmitted in place of the control channel and the DMRS, so that the data throughput can be improved.

Note that slot #1 may be structured so that no control channel is transmitted and a DMRS is transmitted. By means of this structure, it is possible to improve the data throughput while maintaining the accuracy of channel estimation, compared to the case of FIG. 2A. Also, the slots to be aggregated (mini-slots, symbols, and so on) may be slots that neighbor each other (that are continuous) or slots that do not neighbor each other (that are discontinuous).

However, what scheduling policies (as to how to assign TBSs, for example) might work best for each of slot aggregation and non-slot aggregation has not been studied yet. Unless these are determined properly, flexible control will not be possible, and the throughput of communication, the spectral efficiency and so on might deteriorate.

So, the present inventors have studied configurations for slot aggregation and non-slot aggregation, as well as UE operations, and arrived at the present invention.

Now, embodiments of the present invention will be described in detail below with reference to the accompanying drawings. Note that the radio communication methods according to these embodiments may be applied individually or may be applied in combination.

Note that, in the following embodiments, the prefix "NR-," attached to an arbitrary signal or a channel, may be construed as meaning that the signal or the channel is designed for use in NR.

Also, as used in the following embodiments, the phrase "multiple slots" may be construed as meaning either "multiple mini-slots" or "one or more slots and one or more mini slots." In accordance with this interpretation, the term "slot" may be construed as meaning "slot," "mini-slot," "slot and/or mini-slot" and so on. Also, a "mini-slot" may be construed as meaning a "symbol set comprised of one or more symbols."

(Radio Communication Method)

<First Embodiment>

The first embodiment of the present invention relates to assignment of TBSs and the method of reporting TBSs by using DCI. Note that the content to report is not limited to TBSs. For example, information about the number of transmission layers, scrambling IDs (identifiers) and so on may be included.

In each embodiment below, for example, one of the following three configurations may be employed: Configuration A: Where there are multiple slots, the same precoder is applied, and the same DMRS pattern is used; Configuration B: Where there are multiple slots, the same precoder is applied, and different DMRS patterns are used (for example, no DMRS is transmitted in some slots); and Configuration C: Where there are multiple slots, different precoders are applied, and the same DMRS pattern is used.

Here, a DMRS pattern may be referred to as a "DMRS configuration," a "DMRS arrangement pattern" and so on, and represent at least one of the locations of DMRS resources (for example, time and/or frequency resources), the number of DMRS resources, the density of DMRSs in the time and/or frequency directions, DMRS sequences, and so forth. Note that configurations other than configurations A to C may be used as well.

When configuration A is employed, the receiving end can use multiple DMRSs, so that the accuracy of channel estimation can be expected to improve. When configuration B is employed, the DMRS overhead can be reduced. In the event configuration C is employed, the receiving end can perform decoding properly, despite the fact that varying precoders are used in transmission.

[Embodiment 1. 1]

According to embodiment 1.1 of the present invention, one TBS is scheduled or configured for a UE over multiple slots, by using one DCI, and data (TB) of this TBS is allocated using these multiple slots. By using this structure, the signaling overhead required to report TBSs can be reduced, and, furthermore, the same coding rate can be maintained in multiple slots. In addition, since the TBS becomes larger and the code length becomes longer, the coding gain increases.

FIGS. 3A and 3B are diagrams to show examples of allocating and reporting a TBS according to embodiment 1.1. Although three slots (slots #0 to #2) are aggregated in these examples, the number of aggregated slots (slots to be aggregated) according to the present invention is not limited to this. The same will hold with the following examples.

FIG. 3A shows an example in which the same DMRS pattern is used in multiple slots (as in configurations A and C). The DCI that is transmitted in the control channel (control CH) of slot #0 includes information to indicate that slots #0 to #2 are scheduled based on slot aggregation, and reports that data of TBS 0 is scheduled using these aggregated slots.

Based on the DCI detected, the UE transmits or receives the data of TBS 0 over slots #0 to #2. Note that the DCI resources shown in FIGS. 3A and 3B are examples, and are by no means limited to these locations.

FIG. 3B shows an example in which different DMRS patterns are used in multiple slots (as in configuration B). FIG. 3B is different from FIG. 3A in that no DMRS is transmitted in slots #1 and #2. Note that, although, in these examples, the DMRS is allocated to the first slot (slot #0) of aggregated slots, this is by no means limiting. For example, the DMRS may be allocated to a specific slot (for example, the slot in the center (slot #1), or the last slot (slot #2)) among the slots that are aggregated, and does not have to be allocated to the first slot. In this case, by changing the slot to allocate the DMRS to, it is possible to control slots flexibly, especially those slots where the accuracy of demodulation needs to be guaranteed. The same will hold with the following examples.

[Embodiment 1. 2]

According to embodiment 1.2 of the present invention, one TBS is scheduled or configured for a UE over multiple slots, by using one DCI, data of this TBS is allocated to each slot. By using this structure, the signaling overhead required to report TBSs can be reduced. Also, unlike embodiment 1.1, it is not necessary to use a large TBS, such as one that occupies resources of multiple slots, so that flexible use is made possible.

FIGS. 4A and 4B are diagrams to show examples of allocating and reporting a TBS according to embodiment 1.2.

FIG. 4A shows an example in which the same DMRS pattern is used in multiple slots (as in configurations A and C). The DCI that is transmitted in the control CH of slot #0 includes information to indicate that slots #0 to #2 are scheduled based on slot aggregation, and reports that data of TBS 0 is scheduled in each aggregated slot. Based on the DCI detected, the UE transmits or receives the data of TBS 0 in each of slots #0 to #2. Note that the contents of data transmitted or received in each slot may be different or the same.

FIG. 4B shows an example of a case in which different DMRS patterns are used in multiple slots (as in configuration B). FIG. 4B is different from FIG. 4A in that no DMRS is transmitted in slots #1 and #2.

[Embodiment 1.3]

According to embodiment 1.3 of the present invention, multiple TBSs are scheduled or configured for a UE in multiple slots, by using one DCI, and data of each TBS is allocated to each slot. By using this structure, data of different TBSs can be scheduled on a per slot basis, so that flexible control is possible.

FIGS. 5A and 5B are diagrams to show examples of allocating and reporting TBSs according to embodiment 1.3.

FIG. 5A shows an example in which the same DMRS pattern is used in multiple slots (as in configurations A and C). The DCI that is transmitted in the control CH of slot #0 includes information to indicate that slots #0 to #2 are scheduled based on slot aggregation, and reports that data of TBS 0 is scheduled in aggregated slot #0, data of TBS 1 in slot #1 and data of TBS 2 in slot #2. Based on the DCI detected, the UE transmits or receives data of each TBS in each of slots #0 to #2.

FIG. 5B shows an example of a case in which different DMRS patterns are used in multiple slots (as in configuration B). FIG. 5B is different from FIG. 5A in that no DMRS is transmitted in slots #1 and #2.

[Embodiment 1.4]

According to embodiment 1.4 of the present invention, multiple UEs are scheduled or configured for a UE in multiple slots, by using multiple DCIs, and data of each TBS is allocated to each slot. That is, a UE transmits or receives data of one TBS in each slot by using one DCI. Using this structure is equivalent to specifying the TBS for each slot by using existing DCI, so that it is possible to make the configuration of DCI simple, and reduce the processing load on UEs.

FIGS. 6A and 6B are diagrams to show examples of allocating and reporting TBSs according to embodiment 1.4.

FIG. 6A shows an example in which the same DMRS pattern is used in multiple slots (as in configurations A and C). The DCI that is transmitted in the control CHs of slots #0, #1 and #2 reports that data is scheduled in these slots in TBS 0, TBS 1 and TBS 2, respectively. A UE transmits or receives data of each slot's TBS, based on each DCI detected.

FIG. 6B shows an example where different DMRS patterns are used in multiple slots (as in configuration B). FIG. 6B is different from FIG. 6A in that no DMRS is transmitted in slots #1 and #2.

According to the first embodiment described above, a UE can select the TBSs to apply to slots that are properly scheduled, so that signals can be transmitted and/or received suitably even when slot/non-slot aggregation is used.

<Second Embodiment>

A second embodiment of the present invention relates to how to configure (specify) embodiments 1.1 to 1.4, when at least one of these is configurable, from a gNB to a UE.

The method of determining TBS (for example, information as to which of embodiments 1.1 to 1.4 is used to assign TBSs) may be reported explicitly, may be reported implicitly, or may be reported by combining one or more of these.

For example, the method of determining TBS may be configured (specified) from a gNB to a UE by using higher layer signaling (for example, radio resource control (RRC) signaling, broadcast information (the master information block (MIB), system information blocks (SIBs), and so forth), medium access control (MAC) signaling, and/or physical layer signaling (for example, DCI), or by combining these.

Also, the method of selecting TBS may be reported implicitly based on the number of symbols in a mini-slot. For example, the UE may assume that embodiment 1.1 is used when the number of symbols in a given mini-slot is greater (or smaller) than a certain threshold N ($>0$), or assume that embodiment 1.2, 1.3 or 1.4 is used otherwise. Note that, when embodiment 1.1 is used while this number of symbols is greater than N, it is possible to exert control so that the overhead of DCI is reduced, and, on the other hand, if embodiment 1.1 is used while the number of symbols is smaller than N, it is possible to exert control so that the coding gain improves.

Also, the method of selecting TBS may be reported implicitly based on the bandwidth that is scheduled (frequency resource size). For example, the UE may assume using embodiment 1.1 or 1.2 when the number of resource blocks, which is the scheduled bandwidth, is greater (or smaller) than a predefined threshold X ($>0$), or using embodiment 1.3 or 1.4 otherwise.

Also, the method of selecting TBS may be reported implicitly depending on the number of slots scheduled, the number of pieces of TBS information included in DCI, and so forth. For example, the UE may assume that embodiment 1.1 (or 1.2) is used when the number of scheduled slots is greater than M ($>0$) and/or the number of pieces of TBS information included in DCI is one.

According to the second embodiment described above, the UE can determine the method of selecting TBS appropriately, so that flexible control is possible.

<Third Embodiment>

A third embodiment of the present invention relates to how to configure (specify) information about the precoders to apply to aggregated slots (also referred to as "precoder information" and/or the like) from gNB to UE. The precoder information may include information as to whether or not the same precoder is applied to aggregated slots, and/or other pieces of information.

The precoder information may be reported explicitly, may be reported implicitly, or may be reported by combining one or more of these. For example, the precoder information may be configured (specified) from a gNB to a UE by using higher layer signaling (for example, RRC signaling) and/or physical layer signaling (for example, DCI), or by combining these.

The precoder information may be reported implicitly based on the method of determining the TBS for use. For example, when embodiment 1.1 or 1.2 is configured, the UE may assume that the same precoder is configured and applied to slots that are aggregated.

The precoder information may be reported implicitly based on the value of the TBS that is scheduled. For example, the UE may assume that the same precoder is applied to slots where the same TBS is used.

The precoder information may be reported implicitly based on the number of slots scheduled. For example, if the number of scheduled slots is greater (or smaller) than a certain threshold M ($>0$), the UE may assume that the same precoder is used for the scheduled slots.

The precoder information may be also reported implicitly based on the number of symbols in a mini-slot. For example, if the number of symbols in a given mini-slot is greater (or smaller) than a certain threshold N ($>0$), the UE may assume that the same precoder as that of other mini-slots is used.

The precoder information may be reported implicitly based on the bandwidth that is scheduled (frequency resource size). For example, if the number of resource blocks, which are the scheduled bandwidth, is greater (or smaller) than a certain threshold X ($>0$), the UE may assume that the same precoder is used in multiple slots.

According to the third embodiment described above, the UE can appropriately select the precoders to apply to aggregated slots, so that flexible control is possible.

<Fourth Embodiment>

A fourth embodiment of the present invention relates to how to configure (specify) information about the DMRS patterns to apply to aggregated slots (also referred to as "DMRS information" and/or the like) from a gNB to a UE. The DMRS information may include information as to whether or not the same DMRS pattern is applied to aggregated slots, and/or other pieces of information.

The DMRS information may be reported explicitly, may be reported implicitly, or may be reported by combining one or more of these. For example, the DMRS information may be configured (specified) from a gNB to a UE by using higher layer signaling (for example, RRC signaling) and/or physical layer signaling (for example, DCI), or by combining these.

The DMRS information may be reported implicitly based on what method is used to select TBS. For example, if embodiment 1.1 or 1.2 is configured, the UE may assume that the same DMRS pattern is configured and applied to slots that are aggregated.

The DMRS information may be reported implicitly based on the value of the TBS that is scheduled. For example, the UE may assume that the same DMRS pattern is applied to slots where the same TBS is used.

The DMRS information may be also reported implicitly based on precoder information. For example, the UE may assume that different DMRS patterns are applied between multiple slots where different precoders are used.

The DMRS information may be reported implicitly based on the number of slots that are scheduled. For example, if the number of scheduled slots is greater (or smaller) than a certain threshold M (>0), the UE may assume that the same DMRS pattern is applied to the scheduled slots.

The DMRS information may be also reported implicitly based on the number of symbols in a mini-slot. For example, if the number of symbols in a given mini-slot is greater (or smaller) than a certain threshold N (>0), the UE may assume that the same DMRS pattern as that of the other mini-slots is used.

The DMRS information may be reported implicitly based on the bandwidth that is scheduled (frequency resource size). For example, if the number of resource blocks, which is the scheduled bandwidth, is greater (or smaller) than a certain threshold value X (>0), the UE may assume that the same DMRS pattern is used in multiple slots.

According to the fourth embodiment described above, the UE can appropriately select the DMRS configurations to apply to aggregated slots, so that flexible control is possible.

(Variations) Note that each of the above-described embodiments can be applied whether signals that are scheduled are DL signals, UL signals or other signals.

Which way of implicit reporting according to the second to fourth embodiments is used may be determined based on multiple parameters (for example, as mentioned earlier, based on the number of symbols in a mini-slot, the bandwidth that is scheduled and so on) or may be determined based on other parameters. Also, as for comparative terms such as "larger than" and "smaller than," which have been mentioned earlier, which of these can be used to make judgment may be determined based on channel states, the speed at which the UE moves, and so on.

Also, thresholds M, N and X of the second to fourth embodiments may assume different values per embodiment, or may have the same value.

(Radio Communication System)

Now, the structure of the radio communication system according to one embodiment of the present invention will be described below. In this radio communication system, communication is performed using one or a combination of the radio communication methods according to the herein-contained embodiments of the present invention.

FIG. 7 is a diagram to show an exemplary schematic structure of a radio communication system according to one embodiment of the present invention. A radio communication system 1 can adopt carrier aggregation (CA) and/or dual connectivity (DC) to group a number of fundamental frequency blocks (component carriers) into one, where a system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, the number and so on of cells and user terminals 20 are not limited to the examples illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD) in each cell. Furthermore, in each cell (carrier), a single numerology may be used, or a plurality of different numerologies may be used.

A numerology may refer to communication parameters that are applied to transmission and/or receipt of a given signal and/or channel, and may represent at least one of the subcarrier spacing (SCS), the bandwidth, the duration of symbols, the duration of cyclic prefixes, the duration of TTIs (for example, the duration of subframes, the duration of slots, etc.), the number of symbols per TTI, the radio frame configuration, the filtering process, the windowing process and so on.

A structure may be employed here in which wire connection (for example, optical fiber in compliance with the CPRI (Common Public Radio Interface), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that the radio access schemes for the uplink and the downlink are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported via DCI. For example, DCI to schedule receipt of DL data may be referred to as "DL assignment," and DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 8:
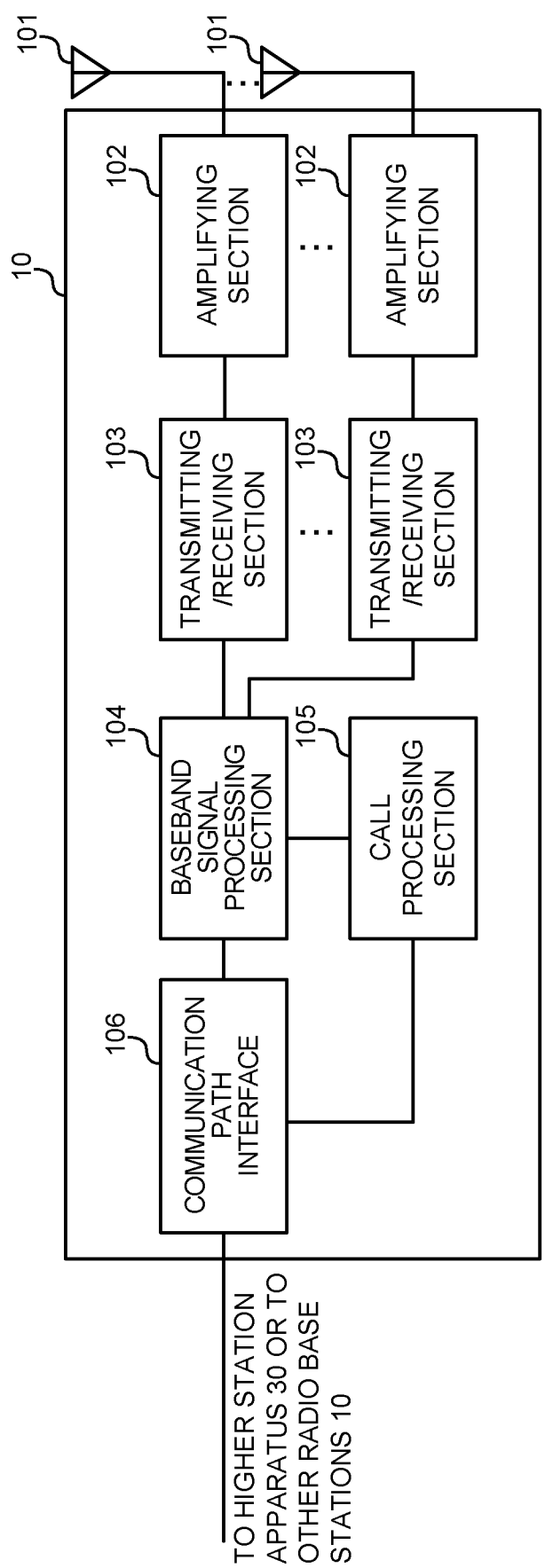
FIG. 8 is a diagram to show an exemplary overall structure of a radio base station according to one embodiment of the present invention.

FIG. 8 is a diagram to show an exemplary overall structure of a radio base station according to one embodiment of the present invention. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit and/or receive multiple signals, which are scheduled in multiple time units, respectively (and to which slot aggregation and/or non-slot aggregation are applied). That is, the radio base station 10 may be referred to as "transmitting apparatus" or as "receiving apparatus."

Also, the transmitting/receiving sections 103 may transmit information about the method of selecting TBS, precoder information, DMRS information and so on, to the user terminals 20.

Figure 9:
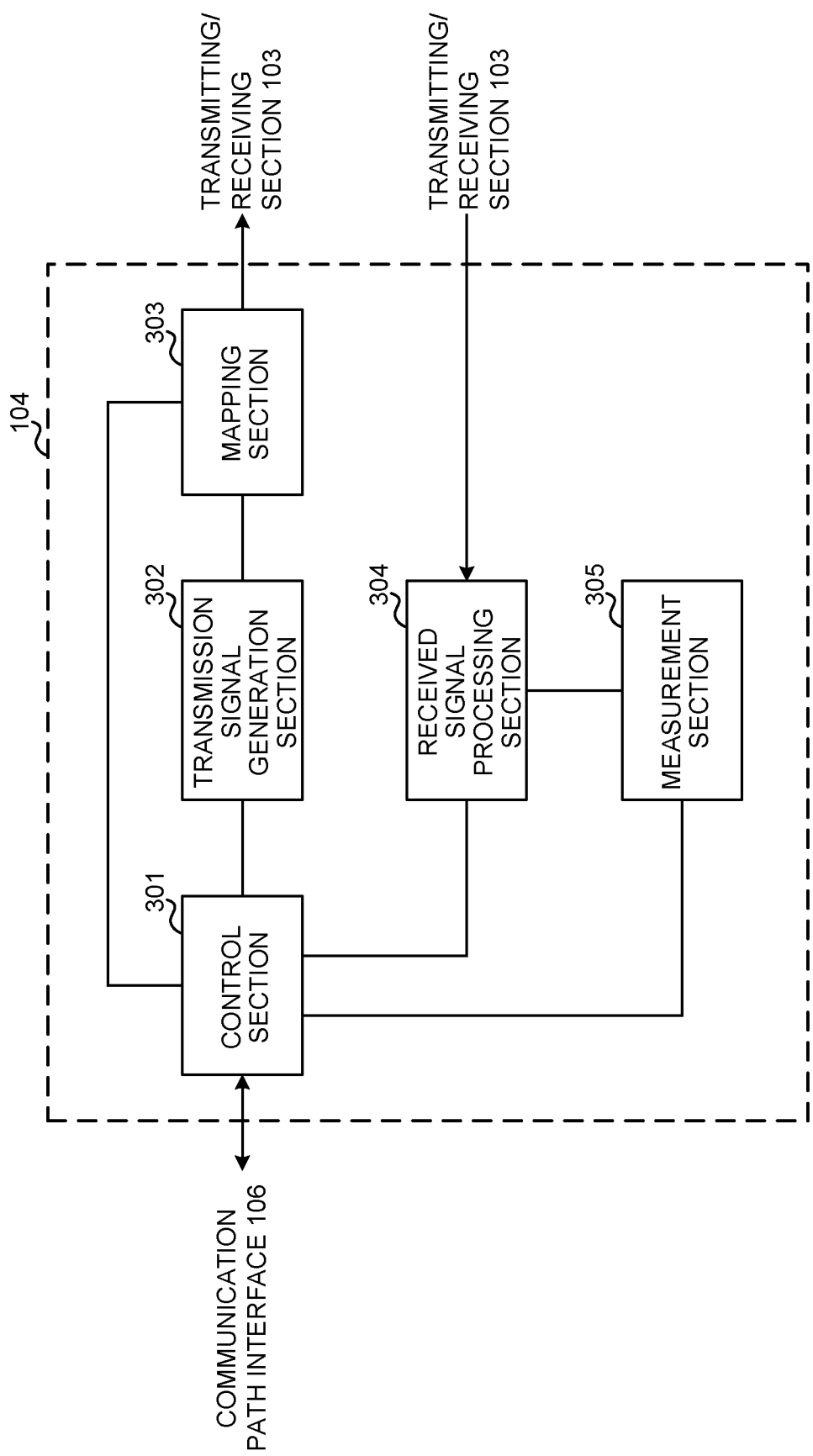
FIG. 9 is a diagram to show an exemplary functional structure of a radio base station according to one embodiment of the present invention.

FIG. 9 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls the signal receiving process in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgement information). Furthermore, the control section 301 controls the generation of downlink control signals, downlink data signals and so on, based on, for example, whether or not retransmission control is necessary, which is decided based on uplink data signals. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 may transmit L1 signaling (for example, DCI) to a user terminal 20, and control the user terminal 20 to transmit and/or receive multiple signals that are scheduled in multiple time units, respectively. The time unit used here may be one of a slot, a mini-slot, a unit comprised of one or more symbols, and so on.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio) and so forth), the signal strength (for example, RSSI (Received Signal Strength Indicator)), transmission path information (for example, CSI), and so on. The measurement results may be output to the control section 301.

Figure 10:
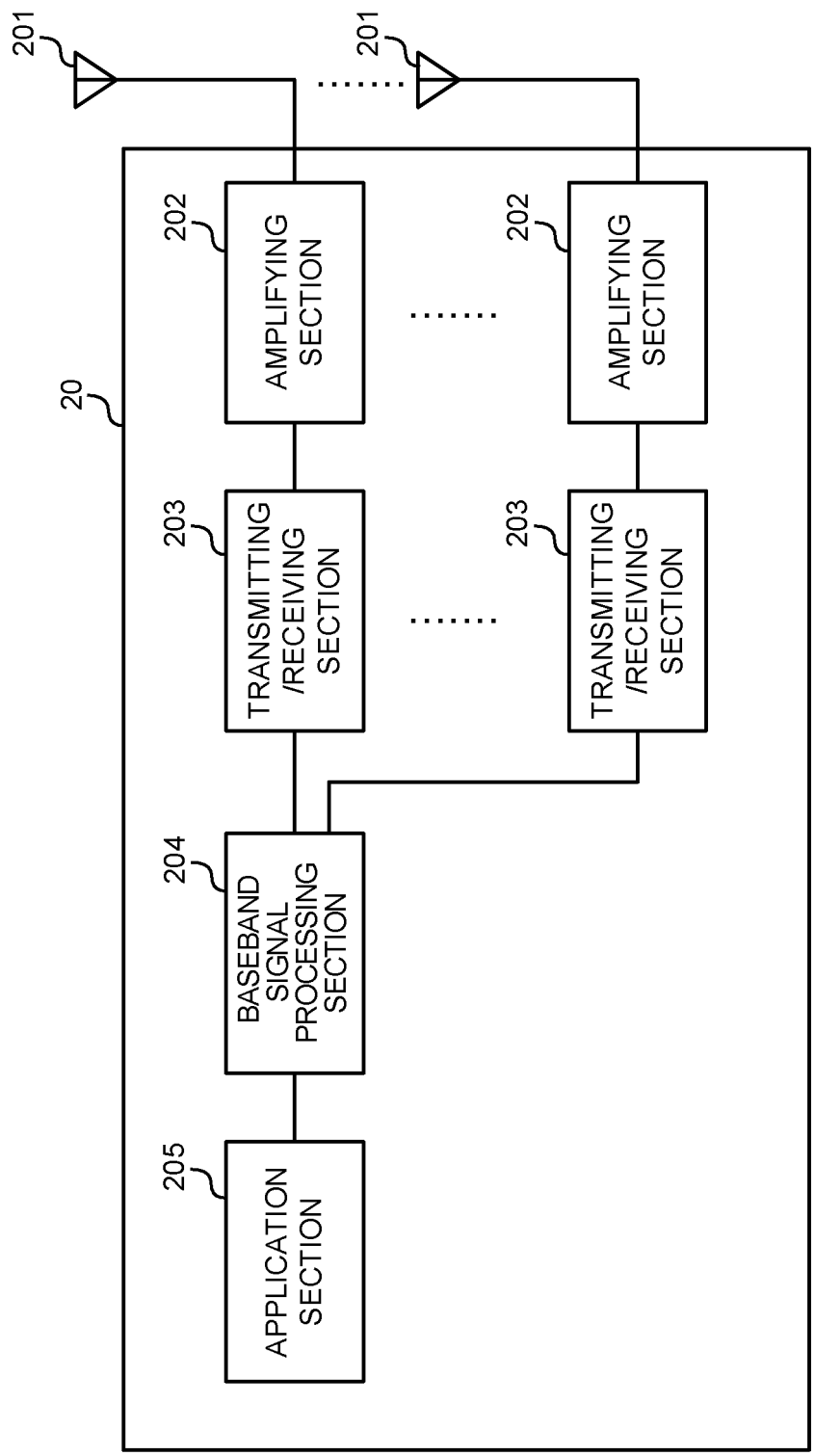
FIG. 10 is a diagram to show an exemplary overall structure of a user terminal according to one embodiment of the present invention.

(User Terminal) FIG. 10 is a diagram to show an exemplary overall structure of a user terminal according to one embodiment of the present invention. A user terminal 20 has a number of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that have been subjected to frequency conversion in the transmitting/receiving sections 203 are amplified in the amplifying sections 202, and transmitted from the transmitting/receiving antennas 201.

The transmitting/receiving sections 203 may transmit and/or receive multiple signals, which are scheduled in multiple time units, respectively (and to which slot aggregation and/or non-slot aggregation are applied). That is, the user terminal 20 may be referred to as "transmitting apparatus" or as "receiving apparatus."

Also, the transmitting/receiving sections 203 may receive information about the method of selecting TBS, precoder information, DMRS information and so on, from the radio base station 10.

Figure 11:
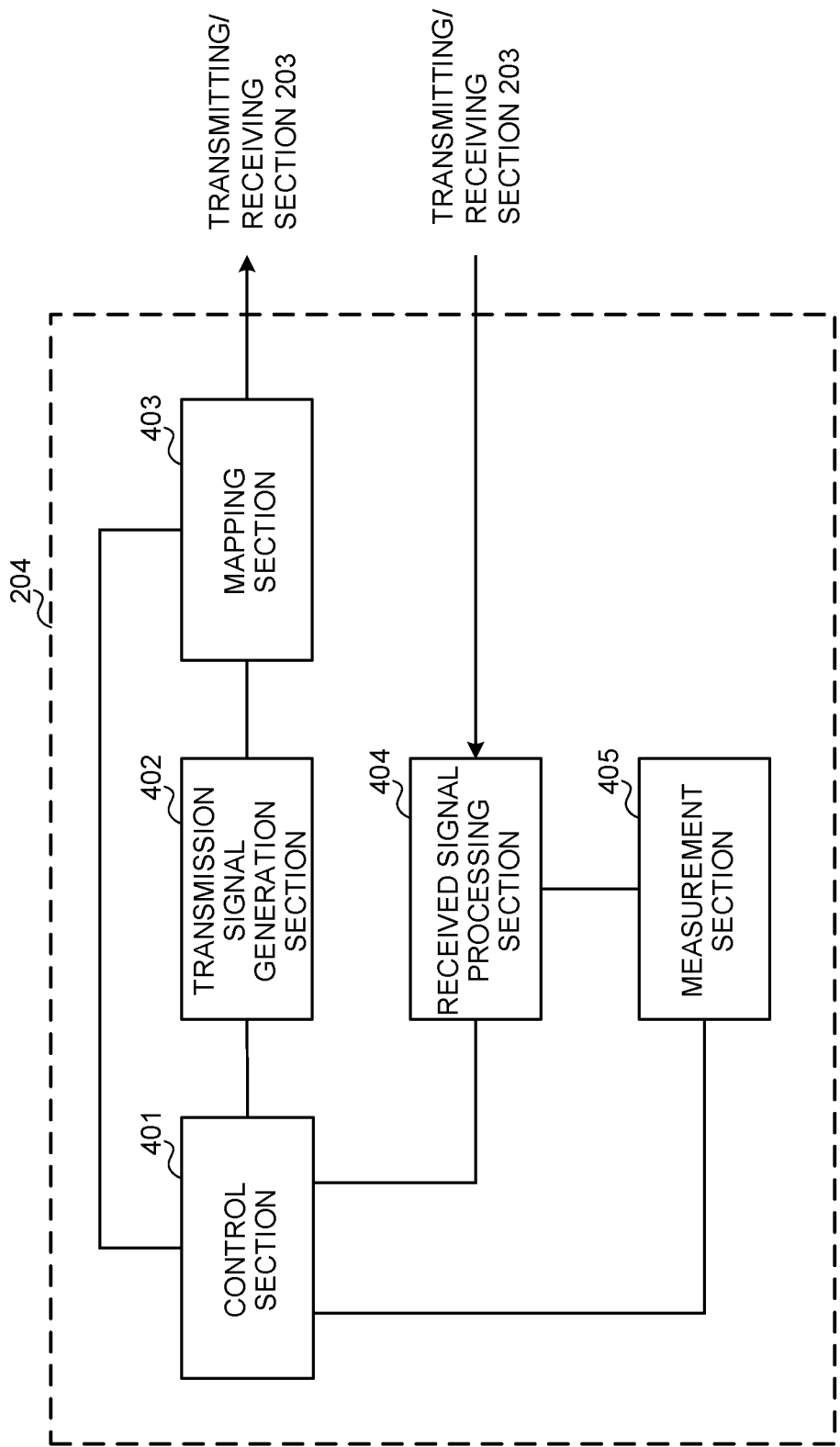
FIG. 11 is a diagram to show an exemplary functional structure of a user terminal according to one embodiment of the present invention.

FIG. 11 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls the signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may exert control so that multiple signals that are scheduled in multiple time units, respectively, are transmitted and/or received based on L1 signaling (for example, DCI) sent from the received signal processing section 404. The time unit used here may be one of a slot, a mini-slot, a unit comprised of one or more symbols, and so on.

Furthermore, the control section 401 may determine which transport block size (TBS) applies to each of the multiple signals (or multiple time units) above. The TBS may be determined on assumption that the configurations described in above embodiments 1.1 to 1.4, and/or other configurations, are used. The control section 401 may select precoders, DMRS patterns and so on, for the above multiple signals (or multiple time units).

For example, when a TBS is indicated by DCI, the control section 401 may judge that this TBS corresponds to the TBS for data that is transmitted over the above multiple time units. When a TBS is indicated by DCI, the control section 401 may judge that this TBS corresponds to the TBS for data that is transmitted per time unit constituting the above multiple time units. When a number of TBSs are indicated by DCI, the control section 401 may judge that these TBSs correspond, respectively, to the TBSs for data that is transmitted per time unit constituting the above multiple time units.

The control section 401 may determine which method of selecting TBS (for example, which one of embodiments 1.1 to 1.4) applies to these multiple signals based on the number of symbols included in the time unit and/or the bandwidth that is scheduled.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically integrated, or may be realized by directly and/or indirectly connecting two or more physically and/or logically separate pieces of apparatus (via wire or wireless, for example) and using these multiple pieces of apparatus.

Figure 12:
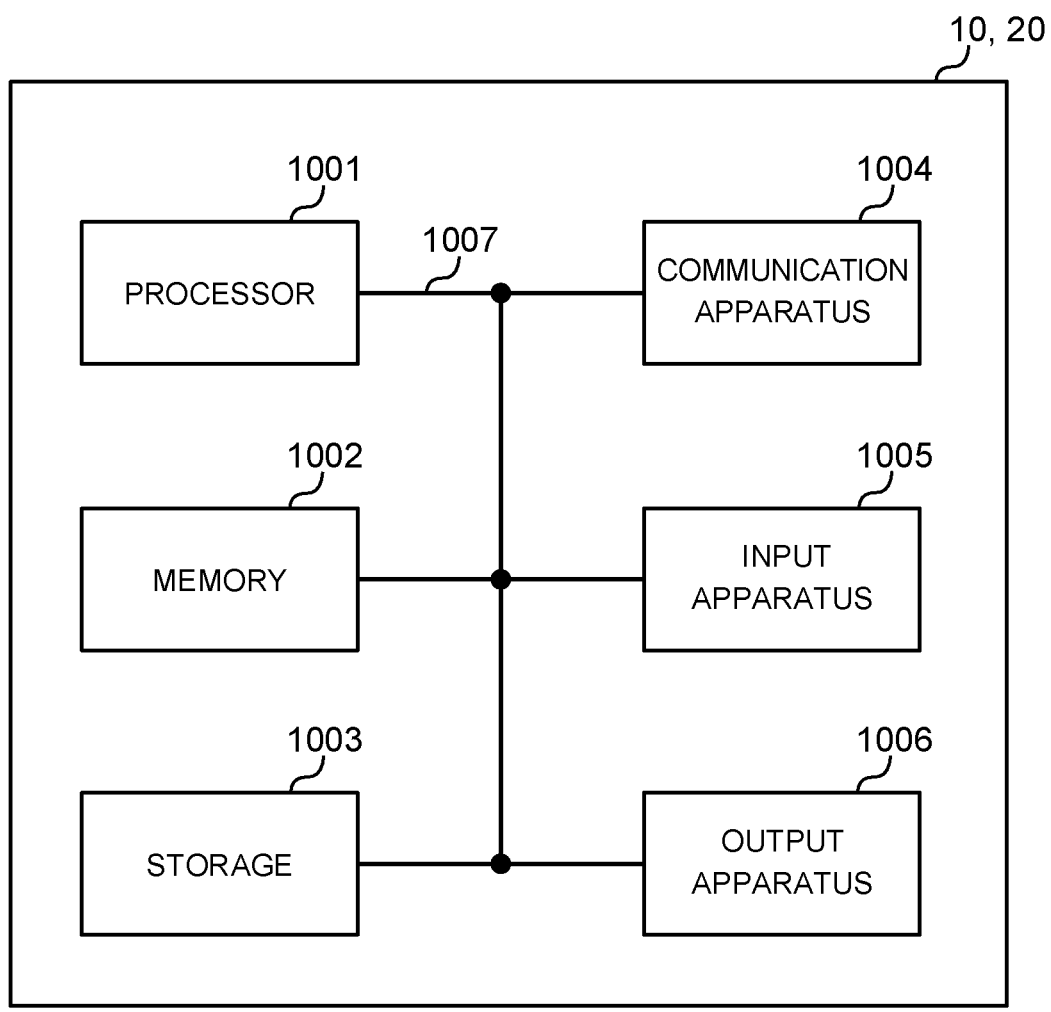
FIG. 12 is a diagram to show an exemplary hardware structure of a radio base station and a user terminal according to one embodiment of the present invention.

For example, the radio base station, user terminals and so on according to embodiments of the present invention may function as a computer that executes the processes of the radio communication method of the present invention. FIG. 12 is a diagram to show an example hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a number of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading certain software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, registers and so on. For example, the above-described baseband signal processing section 104 (204), call processing section 105 and others may be implemented by the processor 1001.

Furthermore, the processor 1001 reads programs (program codes), software modules or data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented using at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) that does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a number of mini-slots. Each mini-slot may consist of one or more symbols in the time domain. Also, a mini-slot may be referred to as a "sub-slot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a number of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one mini-slot is referred to as a "TTI," one or more TTIs (that is, one or multiple slots or one or more mini-slots) may be the minimum time unit of scheduling. Also, the number of slots (the number of mini-slots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a number of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented using other applicable information. For example, a radio resource may be specified by a certain index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a number of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a number of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by its higher nodes (upper nodes). In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access."

As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. An apparatus comprising:
   a transmitter that transmits a transport block (TB) using a physical uplink shared channel based on a downlink control information;
   a processor that applies a same symbol allocation across a plurality of slots when transmission of the TB is carried out over the plurality of slots; and
   an input apparatus that accepts an input,
   wherein the TB contains information based on the input.

2. The apparatus according to claim 1, wherein the input apparatus is at least one of a microphone, a switch, a button, a sensor and a touch panel.

3. A system comprising:
   an apparatus that comprises:
      a transmitter that transmits a transport block (TB) using a physical uplink shared channel based on a downlink control information;
      a processor that applies a same symbol allocation across a plurality of slots when transmission of the TB is carried out over the plurality of slots; and
      an input apparatus that accepts an input,
      wherein the TB contains information based on the input, and
   a base station that comprises:
      a transmitter that transmits the downlink control information to the apparatus.

* * * * *